United States Patent [19]
Matui

[11] 3,952,321
[45] Apr. 20, 1976

[54] OPTICAL SYSTEM FOR EFFECTING INDICATION WITHIN A FINDER IN A SINGLE LENS REFLEX CAMERA
[75] Inventor: Sei Matui, Kawasaki, Japan
[73] Assignee: Nippon Kogaku K.K., Tokyo, Japan
[22] Filed: July 29, 1974
[21] Appl. No.: 492,982

[30] Foreign Application Priority Data
Aug. 10, 1973  Japan................................ 48-89223

[52] U.S. Cl................................ 354/225; 354/54; 354/155
[51] Int. Cl.²........................................ G03B 19/12
[58] Field of Search ................. 354/155, 54, 56, 57, 354/219, 224, 225

[56] References Cited
UNITED STATES PATENTS
3,455,225  7/1969  Isshiki............................. 354/225 X
3,534,671  10/1970  Yamaguchi........................... 354/56
3,687,038  3/1971  Kawakami........................... 354/155

Primary Examiner—L. T. Hix
Assistant Examiner—E. M. O'Connor
Attorney, Agent, or Firm—Fitzpatrick, Cella, Harper & Scinto

[57] ABSTRACT

In a single lens reflex camera having a focusing plate, a pentaroof-prism and an eyepiece, an optical system for indicating information within the view field of the finder includes first prism means disposed on the principal optical axis of the finder between the pentaroof-prism and the eyepiece. The incidence surface of the first prism means is parallel to the emergence surface of the pentaroof-prism and the emergence surface of the first prism means forms a predetermined angle $\alpha$ with a horizontal plane containing the principal optical axis of the finder. A reflector member is disposed at the upper end of the front reflective surface of the pentaroof-prism and outwardly of the boundary point of the finder's view field light. An indicator member is disposed above the first prism means. Second prism means is disposed on the optical axis of the finder between the first prism means and the eyepiece. The incidence surface of the second prism means is parallel to the emergence surface of the first prism means with a slight air space provided therebetween, and the emergence surface of the second prism means is parallel to the incidence surface of the first prism means. The indicator member may be viewed from the eyepiece through the two prism means, the pentaroof-prism and the reflector member with a magnification and visibility equal to those of the finder's view field.

2 Claims, 1 Drawing Figure

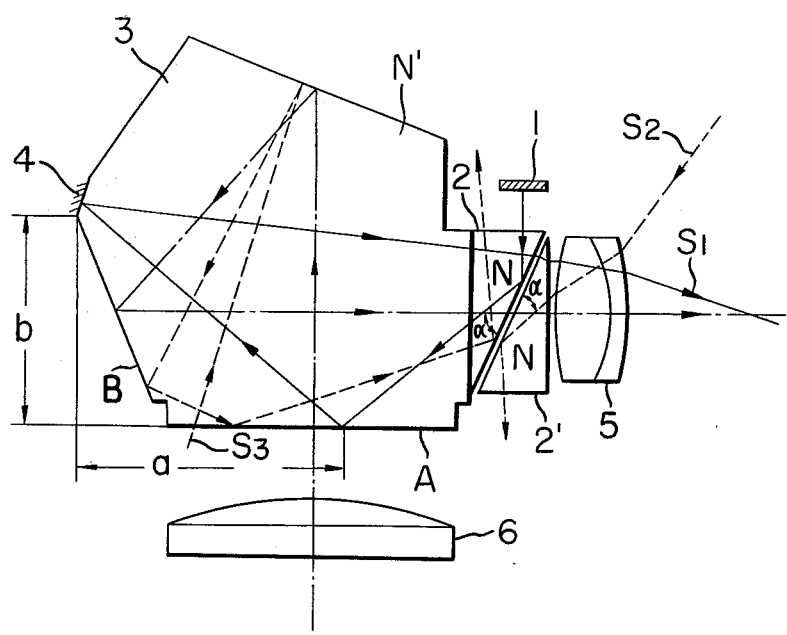

OPTICAL SYSTEM FOR EFFECTING INDICATION WITHIN A FINDER IN A SINGLE LENS REFLEX CAMERA

BACKGROUND OF THE INVENTION

1. Field of the Invention

This invention relates to a finder's optical system in a single lens reflex camera having a pentaroof prism for indicating information as to the proper exposure represented by the F-number, shutter speed, exposure meter needle, light-emitting diode, or the like, within the upper portion of the finder's view field.

2. Description of the Prior Art

Various types of optical systems for indicating information within the finder of a single lens reflex camera have been proposed and have their own merits and demerits.

The most typical method of presenting such indication is that which comprises disposing an indicator member on the focal plane of a focusing plate or between the focusing plate and the bottom surface of a pentaroof-prism, and illuminating the indicator member with the light from a picture-taking lens or any other extraneous light directed thereto in any manner, thereby indicating the information along the periphery of the finder's view field.

Apart from cases in which information is indicated within the finder's view field in superposed relationship with such view field, using the above-described method to indicate the information outwardly of the finder's view field entails a corresponding enlargement of the finder's view field, which could necessarily lead to a corresponding enlargement of the finder system itself and accordingly a relatively large pentaroof-prism.

Further, illuminating the indicator member with the light from the picture-taking lens would involve a serious problem in that the quantity of the effective illuminating light is reduced to provide a lower visibility of the indication itself as would be experienced when the lens is stopped down or when use is made of a lens such as a telephoto lens whose exit pupil is distant from the focal plane. Using any other extraneous light than the light from the picturetaking lens to illuminate the indicator member would also involve a design for preventing entry of the extraneous light into the finder itself, thus complicating the illumination.

In an effort to overcome these disadvantages, there is a method which comprises disposing an indicator member forwardly of the pentaroof-prism and indicating the information within the finder's view field through the pentaroof-prism and eyepiece. In this case, it is most natural and desirable that the indicator member be located at a position conjugate with the focal plane of the finder's view field so as to be viewed with a magnification and visibility equal to those of the view field. For this reason, considerable difficulties are often encountered in adjusting the length of the optical path from the eyepiece to the indicator member as by providing an optical path correcting lens or prism in the optical path.

SUMMARY OF THE INVENTION

I contribute by the present invention an optical system for the indication of exposure values and other types of information within the finder which comprises two prism means disposed between a pentaroof-prism and an eyepiece, and an indicator member disposed at a position above the prism means and conjugate with the focal plane of a focusing plate, thereby eliminating the disadvantages peculiar to the prior art, and by reason of which I am able to indicate the information above and outwardly of the finder's view field with a visibility and magnification equal to those of the finder's view field.

To achieve the foregoing advantages, I provide prism means disposed on the principal optical axis of the finder between the pentaroof-prism and the eyepiece in such a manner that the incidence surface of the first prism means is parallel to the emergence surface of the pentaroof-prism and that the emergence surface of the first prism means forms an angle $\alpha$ with a horizontal plane containing the principal optical axis of the finder. A reflector member is disposed at the upper end of the front reflective surface of the pentaroof prism and outwardly of the boundary point of the finder's effective view-field light. An indicator member having the information to be indicated is disposed above the first prism means. In order that a light beam from the indicator member may be totally reflected by the emergence surface of the first prism means and then the bottom surface of the pentaroof-prism and reflected by the reflector member so as to be directed to the upper portion of the finder's view field, the angle $\alpha$ is selected to satisfy certain relations which will further be described. Second prism means are disposed on the optical axis of the finder between the first prism means and the eyepiece in such a manner that the incidence surface of the second prism means is parallel to the emergence surface of the first prism means with a slight air space interposed therebetween and that the emergence surface of the second prism means is parallel to the incidence surface of the first prism means. The indicator member is positioned so that it may be viewed from the eyepiece through the emergence surface of the first prism means, the bottom surface of the pentaroof-prism, the reflector member and the first and second prism means, with a magnification and visibility equal to those of the finder's view field.

The first prism means may have its incidence surface joined to the emergence surface of the pentaroof-prism; or, alternatively, the first prism means may be formed integrally with the pentaroof-prism.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWING

Specific embodiments of the invention have been chosen for purposes of illustration and description, and are shown in the accompanying drawing forming a part of the specification wherein the accompanying drawing comprises a single FIGURE showing schematically the optical system according to an embodiment of the present invention.

DESCRIPTION OF THE PREFERRED EMBODIMENT

Referring to the drawing, reference numeral 1 designates an indicator member or the optical image thereof. As shown, I prefer that the first prism means take the form of a right angle triangular prism 2 having its incidence surface joined to the emergence surface of a later-described pentaroof-prism 3 and its emergence surface forming an angle $\alpha$ with a horizontal plane containing the principal optical axis of a finder. Optical path correcting prism means, which I illustrate as a second right angle triangular prism 2', has its incidence surface parallel to the emergence surface of the first prism 2 with a slight air space interposed therebetween, and has its emergence surface parallel to the incidence surface of that prism. A pentaroof-prism 3 has a bottom surface A and a front reflective surface B. A mirror-surfaced reflector member 4 is provided adjacent the upper end of the front reflective surface B. An eyepiece 5 is provided in facing relationship with the optical path correcting prism 2'. Letters $a$ and $b$ represent the horizontal and the vertical distance, respectively, from the total reflection point in the bottom surface of the pentaroof-prism to the boundary point of the finder's effective view-field light located near the upper end of the front reflective surface B. Reference numeral 6 designates a focusing plate.

The prism 2 may also be formed integrally with the pentaroof-prism 3; or, alternatively, it may be disposed on the principal optical axis of the finder in such a manner that the incidence surface of the prism 2 is parallel to the emergence surface of the pentaroof-prism with a slight air space interposed therebetween and that the emergence surface of the prism 2 forms an angle $\alpha$ with a horizontal plane containing the principal optical axis of the finder.

A light beam S1 emergent from the indicator member 1 is totally reflected by the emergence surface of the prism 2, and then the bottom surface A of the pentaroof-prism 3, and travels to the mirror-surfaced reflector member 4 provided adjacent the upper end of the front reflective surface B of the pentaroof-prism 3, where the light beam is mirror-reflected to pass through the reflector prisms 2, 2' and eyepiece 5 to an eye, thus providing an indication of information. In this manner, the indicator member 1 is set in conjugate relationship with the focal plane on the focusing plate 6 with respect to the eyepiece 5; that is, the optical length from the indicator member to the eyepiece through the emergence surface of prism 2, the bottom surface of the pentaroof-prism 3, the reflector member 4 and the prisms 2, 2', may be equal to the optical distance from the focusing plate 6 to the eyepiece 5.

In order that the light beam S1, emergent from the indicator member 1, may be totally reflected by the emergence surface of the prism 2, the angle $\alpha$ must satisfy the relation:

$$\alpha > \sin^{-1} \frac{1}{N},$$

where N is the refractive index of the prism.

Next, in order that the reflected light beam may be totally reflected by the bottom surface of the pentaroof-prism 3 and that the thus totally reflected light beam may be directed to the vicinity of the upper end of the front reflective surface b which does not detract from the finder's effective view-field light in the reflective surface B, the angle $\alpha$ must be determined so as to satisfy the relation:

$$\tan^{-1} \frac{b}{a} < \sin^{-1} \left\{ \frac{N}{N'} \sin(2\alpha - 90°) \right\} < 90° - \sin^{-1} \frac{1}{N'},$$

where N' is the refractive index of the pentaroof-prism 3. It is recalled that $a$ and $b$ are the horizontal and the vertical distances to the boundary point of the finder's effective view-field light.

The mirror-surfaced reflector member 4 may be provided by utilizing a portion of the pentaroof-prism 3 adjacent the upper end of the front reflective surface B thereof, as in the shown embodiment. The same result may also be achieved by causing the light beam S1 to emerge from the prism 3 briefly and be reflected by a mirror-surfaced reflector member or a total reflection member disposed outwardly of the prism 3 so as again to pass through the prism 3 and further through the prisms 2, 2' and eyepiece 5 to the eye.

The prisms 2 and 2' function to intercept any harmful light entering through the eyepiece 5 as well as any harmful light which may result from the total reflection effected by the bottom surface of the pentaroof-prism.

More specifically, the harmful light, as indicated by a broken line S2, which would otherwise enter through the eyepiece 5 into the pentaroof-prism 3 to adversely affect the metering accuracy of an exposure meter, may be totally reflected by the emergence surface of the prism 2' thereby to prevent the entry of such harmful light into the pentaroof-prism 3.

Also, other harmful light, as indicated by a broken line S3, which would otherwise enter through a picture-taking lens into the pentaroof-prism 3 and be totally reflected by the bottom surface A of the prism 3 toward the eyepiece 5, may be totally reflected by the emergence surface of the prism 2 thereby to prevent such harmful light from adversely affecting the image in the finder's view field.

According to the above-described construction of the present invention, two similarly configured prisms shown as right angle triangular prisms are disposed between the emergence surface of the pentaroof-prism and the eyepiece and an indicator member is disposed above the triangular prisms, whereby information indication may be provided at a predetermined position above and outwardly of the finder's view field. Moreover, the two prisms are highly useful in effect inasmuch as they also serve to prevent harmful light from entering through the eyepiece and harmful light resulting from the total reflection effected by the bottom surface of the pentaroof-prism.

A further advantage of the present invention is that the location of the indicator member may be freely selected to some extent without destroying the conjugate relationship depending on value of $\alpha$ selected, as far as the location is above the triangular prisms.

I believe that the construction and application of my novel optical system will now be understood and that the advantages thereof will be fully appreciated by those persons skilled in the art.

I claim:

1. A system for indicating information within the view-field of a finder in a single lens reflex camera having a photographic lens, said finder having a focusing plate, a pentaroof-prism disposed on the optical emergence axis of said focusing plate and an eyepiece disposed on the optical emergence axis of said pentaroof-prism, said pentaroof-prism having a first light transmitting surface through which light rays from the photographic lens enter said pentaroof-prism, a first reflecting surface forming a roof, a second reflecting surface adjacent to said first light transmitting surface, and a second light transmitting surface through which light rays reflected by said first and second reflecting surfaces pass toward said eyepiece, said system comprising:

first prism means (2) disposed on the principal optical axis of the finder between said pentaroof-prism and said eyepiece in such a manner that the incidence surface of said first prism means is parallel to said second light transmitting surface of said pentaroof-prism and that the emergence surface of said first prism means forms an angle $\alpha$ with a horizontal plane containing the principal optical axis of the finder;

a reflector member (4) disposed at the upper end of said second reflecting surface of said pentaroof-prism and outwardly of the path of the finder's effective view-field light, the latter being light passing from the photographic lens and incident upon said eyepiece, said reflector member being adapted to reflect light into the view-field of said finder;

an indicator member disposed above said first prism means and adapted to contain information to be indicated;

said angle $\alpha$ a being selected so that a light beam from said indicator member will be totally reflected by the emergence surface of said first prism means and then reflected by said first light transmitting surface of said pentaroof-prism and reflected by said reflector member so as to be directed to the upper portion of the finder's view-field, said angle $\alpha$ satisfying the relations:

$$\alpha > \sin^{-1} \frac{1}{N} \qquad (1)$$

$$\tan^{-1} \frac{b}{a} < \sin^{-1} \left\{ \frac{N}{N'} \sin(2\alpha - 90°) \right\} < 90° - \sin^{-1} \frac{1}{N'}, \qquad (2)$$

where N is the refractive index of said first prism means, N' is the refractive index of said pentaroof-prism, $a$ is the horizontal distance from the total reflection point of a light beam from said indicator member in said first transmitting surface of said pentaroof-prism to the upper end of said second reflecting surface of said pentaroof-prism which is a boundary of the path of the finder's effective view-field light, and $b$ is the vertical distance from said total reflection point to said boundary; and second prism means (2') disposed on the optical axis of the finder between said first prism means (2) and said eyepiece in such a manner that the incidence surface of said second prism means is parallel to the emergence surface of said first prism means with a slight air space interposed therebetween and that the emergence surface of said second prism means is parallel to the incidence surface of said first prism means;

said indicator member being positioned so that an optical path length from said indicator member to said eyepiece through the emergence surface of said first prism means, the bottom surface of said pentaroof-prism, said reflector member and said first and second prism means, is equal to an optical path length from said focusing plate to said eyepiece via said first and second reflecting surfaces.

2. An optical system according to claim 1, wherein said prism means are right angle triangular prisms.

* * * * *